United States Patent [19]

Pelabon, Andre E.

[11] 3,862,604

[45] Jan. 28, 1975

[54] LOCOMOTIVE ENGINE COMPARTMENT

[75] Inventor: Pelabon, Andre E., Paris,, France

[73] Assignee: ANF Frangeco S.A., Couroevoie, Hauts-de-Seine, France

[22] Filed: Apr. 13, 1973

[21] Appl. No.: 350,811

[52] U.S. Cl.................... 105/61.5, 55/276, 55/419, 105/36, 105/452

[51] Int. Cl. ...... B61c 5/02, B61c 5/04, B61d 17/18

[58] Field of Search ....... 105/61.5, 36, 452; 55/276, 55/419; 112/415

[56] References Cited
UNITED STATES PATENTS

| 366,292 | 7/1887 | Arnold | 105/452 |
|---|---|---|---|
| 1,116,351 | 11/1914 | Evans | 112/415 |
| 2,619,918 | 12/1952 | Hughes | 105/61.5 |

Primary Examiner—Lloyd L. King
Assistant Examiner—Howard Beltran

[57] ABSTRACT

An engine compartment of a gas-turbine railway train having a vehicular engine compartment containing driving components and their accessories, and auxiliary power production equipment units constructed and arranged in inter-grouping relation therewithin, the vehicular engine compartment being thermally and acoustically insulated throughout and being adapted for proximate location near baggage or passenger spaces. The vehicular engine compartment may include a stabilization chamber for receiving air through scoop means for thence expanding the air before its entry into air filter means. Heating means for melting snow is included within the filter means. The filter means, the driving and auxiliary components may be easily assembled and disassembled.

7 Claims, 2 Drawing Figures

LOCOMOTIVE ENGINE COMPARTMENT

CROSS-REFERENCES TO RELATED INFORMATION AND REFERENCES

This application for patent is co-pending with at least the following related applications concurrently filed herewith:

Ser. No. 350,807, Gas Turbine Powered Self-Propelled Railway Train; Ser. No. 350,812, Air Intake System, and; Ser. No. 350,813 Air Filter.

BRIEF SUMMARY OF THE INVENTION

The present invention concerns the inter-grouping inside a single compartment of the engine-driving components of a gas-turbine-driven power car. More particularly, the invention relates to a power driven vehicle on tracks characterized by the fact that, since the power components are grouped in a compartment that is thermally and acoustically insulated, this special compartment can be located near utilitarian compartments for commercial use, either for baggage or for passengers.

FIELD OF THE INVENTION

Gas turbines are already well known for their use as the main propulsion device in locomotive or power cars. The same is true of diesel engine equipment having a gas turbine auxiliary unit. These gas turbine and power unit equipments usually occupy the bulk of the space in the vehicle leaving little room free in the forward part for the engineer's cab, and no space useful for passengers, baggage, and the like.

The purposes of the invention are to group all the power components compactly together with their accessories in a compartment that is particularly insulated both thermally and acoustically. This construction therefore makes it possible to install the passenger luggage compartment a fairly short distance away from this compartment.

The engine compartment is subdivided into two parts:

a. One part is called the "stabilization chamber," in which, after passing through the scoop, the air expands before entering the air filter; and b. A second part called the "turbine compartment" accommodating both the main and auxiliary turbines as well as the exhaust release.

BACKGROUND OF THE INVENTION

An object and advantage of the present invention is to provide an engine compartment in a gas-turbine railway train having a vehicular engine compartment containing driving components and their accessories, and auxiliary power production equipment units constructed and arranged in inter-grouping relation therewithin, and to provide the vehicular engine compartment thermally and acoustically insulated throughout and being adapted for proximate location near baggage or passenger spaces.

A further object and advantage of the invention is to provide a vehicular engine compartment including a Stabilization chamber for receiving air through scoop means and thence expanding the air before its entry into air filter means.

It is a further object and advantage of the invention to provide means for supplying air to the turbines including a heating means to cause the melting of snow that may enter within the air filter means.

Another object of the invention is to provide means for ease of disassembly of the driving and auxiliary components via an opening provided in the flare for exhaust muffler means.

A further object and purpose of the invention is to provide new filter means of a dry-type air filter having readily disassembled components and easy to clean.

Another object of the invention is to provide means for the air conduits substantially of wide diameter, thereby having a low intake loss, and ensuring the supplying of air to the turbines under optimum conditions for maximizing the reduction of causes of pollutants being added or dispersed into the air.

BRIEF DESCRIPTION OF THE SEVERAL VIEWS OF THE DRAWING

The above and other objects and advantages of the invention will become apparent upon full consideration of the following detailed description and accompanying drawings in which.

DETAILED DESCRIPTION OF THE PREFERRED EMBODIMENT

Figure 1:
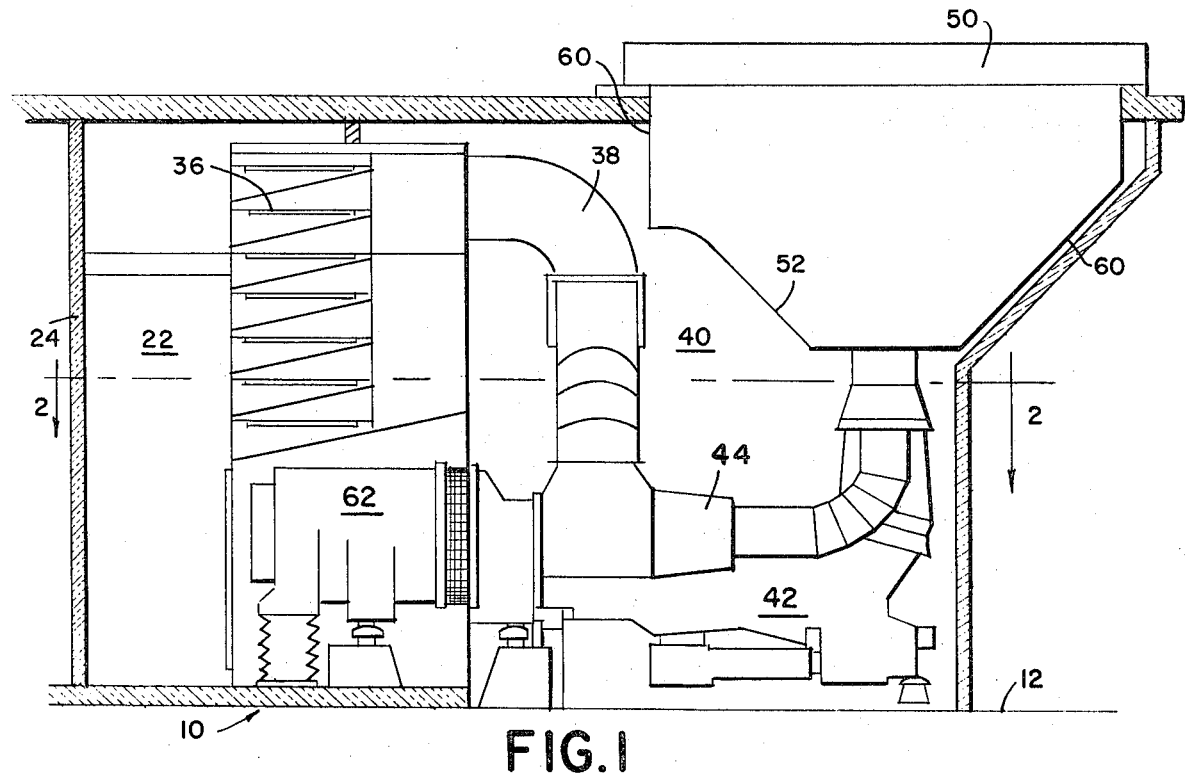
FIG. 1 is a cross-sectional side view of a portion of of a gas-turbine railway car showing the compartment containing the main and auxiliary engines according to a preferred embodiment of the invention.
Figure 2:
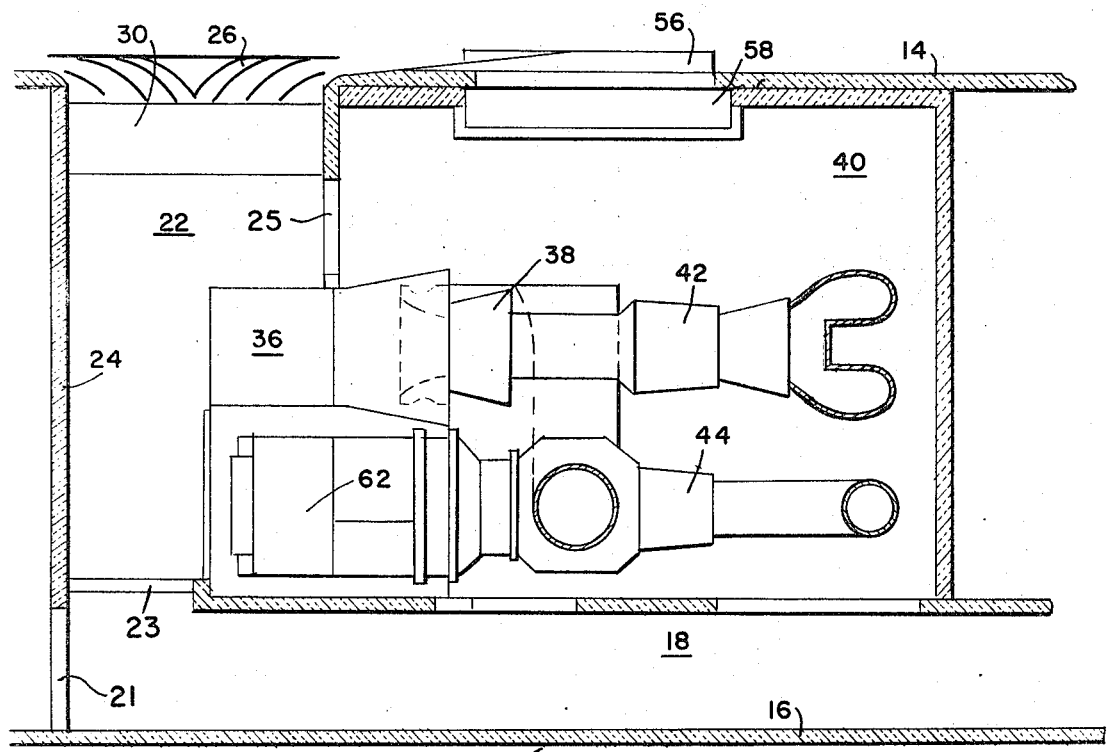
FIG. 2 is a cross-sectional view taken generally along line 2—2 of FIG. 1.

Referring now to the drawing, there is shown an engine compartment 10 of a gas turbine railway train having a deck surface 12 and side walls 14, 16. A train this type is disclosed and claimed in application Ser. No. 350,807, filed concurrently with this application. Said companion application discloses a multi-car train having identical power cars at each end divided into compartments for the carrying passengers and their baggage as well as sound proofed compartments for motive power plants for propelling the train and for generating auxiliary electrical power. A passageway 18 is provided to extend along the length of the compartment 10. In the engine compartment 10 is a space called a stabilization chamber 22 containing or defined by a forward wall 24 and within which air from the outside of the engine compartment is drawn into it via vents of an intake scoop 26 located on the lateral surface or wall 14. Access to the driver's compartment, forward, is through doorway 21, in wall 24, and access to compartment 22 is through doorway 23. The passageway leads toward the right to a baggage compartment, as shown in said companion application. The air from the scoop 26 crosses or traverses through the sound dampening device or louver 30, and by its intricate construction of louver elements comprising the louvre 30 the turbine noise reaching the outside of the compartment is reduced.

When the railway car or train is running, the scoop 30 enables the channeling of the outer air toward the inside of the engine compartment 10 and drawn toward the inside of the filter 36 by effecting or bringing about a slight elimination of air in the stabilization chamber 22. The filter 36 is of the dry type air filter having component elements shown readily capable of disassembly and easy to clean, which are disclosed and claimed in application Ser. No. 350,813, filed concurrently with this application. The filter has a wide passage section for this purpose.

The air then passes from the filter 36 through the conduit 38 in the turbine compartment 40, thence into the driving or main traction turbine 42 and the auxiliary turbine 44. Access between compartments 22 and 40 is by means of a doorway 25.

Combustion of fuel and air is accomplished in the turbines 42, 44 in the conventional manner and need not be explained and described here.

From the turbines 42, 44 are expelled exhaust gases which pass through the muffler system or means 50 and being divided into two parts, one relating to the main turbine 42 and the other to the auxiliary turbine 44. The exhaust gases passing the muffler means 50 are released through a wide-mouthed opening of a flare or throat section 52.

The turbine compartment 40 includes on one of its lateral surfaces or walls 14 a ventilation scoop 56 equipped with an inside sound attenuation device 58 enabling the renewal of the air supply, which is drawn out by the Venturi effect via the exhaust.

In the event of heavy snowfall, snow can get in through scoop 26 and be deposited in the compartments of the filter 36. To correct this situation, a conduit forming a double wall surrounds the muffler 50, and air within the double wall is heated and directed back toward the filter 36 to melt the snow that may enter within the air filter means.

Inlets located on the upper part of the flange enable the air to circulate between the conduit and the muffler base and also to become heated. This warm air is channeled, if necessary, by means of a register and a conduit whose opening is located in front of the air filter 36, thereby triggering the melting of the snow that has reached the filter. This arrangement is disclosed and claimed in application Ser. No. 350,812, filed concurrently with this application.

For maintenance, disassembly is facilitated by the fact that, following disassembly of the exhaust device or muffler means 50, a wide opening is available through the opening on removal of the muffler means 50, so that the turbine may be lifted up through the opening.

The removal of the turbines 42, 44 and their accessories, including the alternator 62 and other components, is thus readily facilitated.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What is claimed is:

1. A self-propelled passenger car for a railway train having a plurality of compartments therein, one of said compartments being thermally and acoustically insulated, said one compartment being subdivided into a stabilization chamber and an engine compartment, one exterior side wall of said stabilization chamber being provided with a bi-directional air intake opening, a main gas turbine for propelling said car and an auxiliary gas turbine for supplying electrical power contained in said engine compartment, an exhaust opening provided in the exterior roof of said engine compartment and means for conducting exhaust gases from said turbines to said exhaust opening, means including air filter means for communication between the air intakes of said gas turbines and the interior of said stabilization chamber, and a sound attenuated air inlet provided in an exterior wall of said engine compartment for normal air circulation therein.

2. The invention defined in claim 1, wherein an adjacent compartment in said railway car is for baggage.

3. The invention defined in claim 1, wherein said means for conducting exhaust gases comprises muffler means disposed in said opening in the exterior roof.

4. The invention defined in claim 3, wherein said muffler means is removable from said opening in the roof and the size of said opening is sufficient to permit removal of a gas turbine from said car through said opening.

5. The invention defined in claim 1, wherein another of the compartments in said railway car is to be occupied by passengers.

6. The invention defined in claim 5, wherein said passenger car is provided with parallel side walls, one of said side walls defining said one exterior wall of the stabilization chamber provided with said bi-directional air intake opening, said intake including a series of vanes extending angularly outwardly beyond the side wall of the car, certain of the elements being directed in one longitudinal direction, and other elements being directed in the opposite longitudinal direction.

7. The invention defined in claim 6, wherein said air intake also includes sound deadening interior louvers.

* * * * *